(12) United States Patent
Lesle

(10) Patent No.: US 7,976,094 B2
(45) Date of Patent: Jul. 12, 2011

(54) FOLDING LOCATOR PIN FOR GLASS PANELS

(75) Inventor: Michael J. Lesle, Toledo, OH (US)

(73) Assignee: Zeledyne, LLC, Allen Park, MI (US)

( * ) Notice: Subject to any disclaimer, the term of this patent is extended or adjusted under 35 U.S.C. 154(b) by 180 days.

(21) Appl. No.: 12/397,458

(22) Filed: Mar. 4, 2009

(65) Prior Publication Data

US 2010/0225138 A1    Sep. 9, 2010

(51) Int. Cl.
B60J 1/02    (2006.01)
(52) U.S. Cl. ............. 296/96.21; 52/204.593; 52/204.63
(58) Field of Classification Search ........... 52/204.593, 52/204.595, 204.597, 204.62, 204.63, 204.65, 52/204.66, 204.72, 762, 763, 764, 765, 786.1, 52/786.11; 296/84.1, 96.21, 146.15, 201; 428/46, 99
See application file for complete search history.

(56) References Cited

U.S. PATENT DOCUMENTS

| | | | |
|---|---|---|---|
| 5,475,956 A * | 12/1995 | Agrawal et al. | 52/208 |
| 6,099,063 A | 8/2000 | Rohagti | |
| 6,460,917 B2 * | 10/2002 | De Paoli | 296/201 |
| 6,467,225 B1 * | 10/2002 | Shimomura | 52/204.5 |
| 6,942,280 B2 * | 9/2005 | Hintzke et al. | 296/181.2 |
| 6,957,849 B2 | 10/2005 | Eloian et al. | |
| 7,270,236 B2 | 9/2007 | Angeletti et al. | |
| 7,686,266 B2 * | 3/2010 | Torigoe et al. | 248/222.12 |
| 2005/0045512 A1 | 3/2005 | Carroll, Jr. | |
| 2008/0012388 A1 | 1/2008 | Kinoshita et al. | |
| 2010/0320806 A1 * | 12/2010 | Senge et al. | 296/201 |

FOREIGN PATENT DOCUMENTS

| | | | |
|---|---|---|---|
| DE | 19649762 A1 | | 6/1998 |
| FR | 2796764 A1 | | 1/2001 |
| JP | 61092915 A | * | 5/1986 |
| JP | 61249812 A | * | 11/1986 |
| JP | 01204819 A | * | 8/1989 |
| JP | 05286360 A | * | 11/1993 |
| JP | 09142141 A | * | 6/1997 |
| JP | 10086660 A | * | 4/1998 |
| JP | 11180143 A | * | 7/1999 |
| JP | 11189039 A | * | 7/1999 |
| JP | 2007008275 A | * | 1/2007 |
| JP | 2007290692 A | * | 11/2007 |
| WO | 9958355 A1 | | 11/1999 |
| WO | WO 9958355 A1 | * | 11/1999 |
| WO | 2009053463 A1 | | 4/2009 |

* cited by examiner

Primary Examiner — Glenn Dayoan
Assistant Examiner — Paul Chenevert
(74) Attorney, Agent, or Firm — MacMillan, Sobanski & Todd LLC

(57) ABSTRACT

A locator pin aligns a glass panel during installation on a vehicle. The locator pin includes a base for affixing to the glass panel in a predetermined position prior to transporting it from a site where the glass panel is formed. A pin body has an elongated portion with a proximal end and a distal end defining a longitudinal axis. A hinge pivotally attaches the pin body to the base at the proximal end so that the pin body pivots between a shipping position wherein the longitudinal axis is substantially parallel to a surface of the glass panel and an alignment position wherein the longitudinal axis is substantially perpendicular to the surface of the glass panel. The folding pin allows glass panels to be stacked closer together in shipping racks when they are transported from the glass fabrication facility to a place of installation.

18 Claims, 5 Drawing Sheets

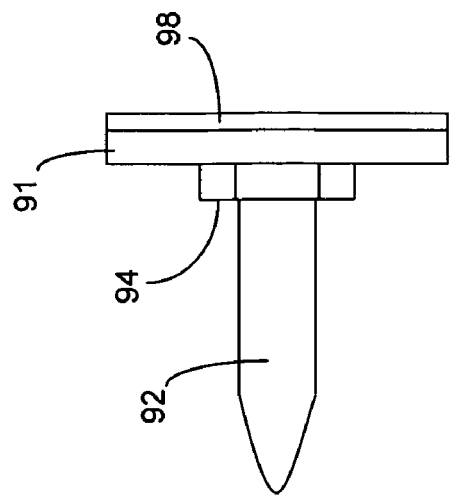
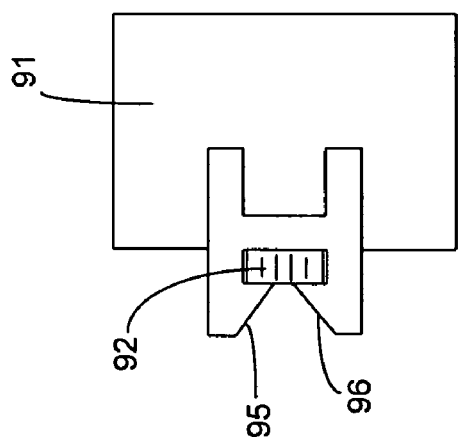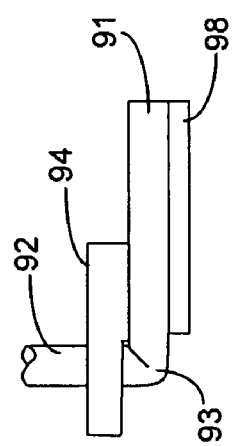
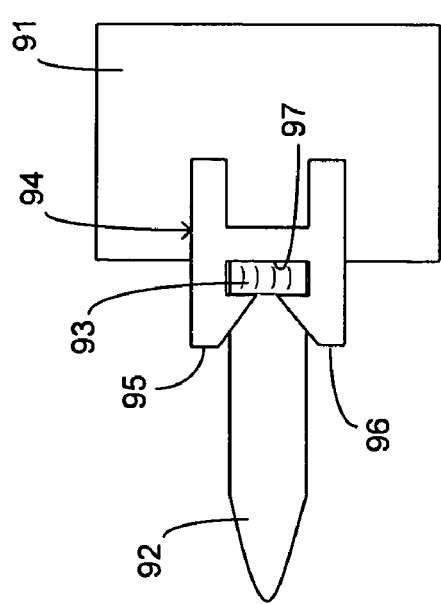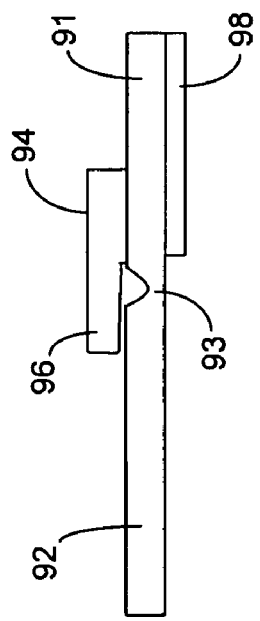

FOLDING LOCATOR PIN FOR GLASS PANELS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to the handling and installation of glass panels such as automotive windshields, and, more specifically, to an alignment pin on a glass panel that mates with holes in a mounting frame to align the glass panel while it is bonded to the mounting frame.

Locator pins are commonly used as an assembly aid on automotive glass (such as windshields and backlites) to correctly locate and temporarily hold the glass panel in the proper position until a bonding/sealing agent (e.g., urethane) applied around the periphery of the glass panel has cured. After the urethane cures, the locator pins have no further function.

The locator pins must be accurately positioned on the surface of the glass panel to correspond with mounting holes in the vehicle frame so that the glass panel is properly centered within the vehicle frame and held at a desired height from the frame to accommodate the desired width of urethane. To simplify the glass panel placement within the vehicle frame and mounting holes, a substantial pin length is desired. However, the height of the locator pins decreases the packing density of the glass panels during transportation from the glass manufacturer to the vehicle assembler. The reduction in packing density increases overall shipping costs as well as the expenditures for fabricating and transporting racks in which the glass panels are shipped. In order to avoid cost increases related to inefficient packaging, glass manufacturers sometimes open local facilities near the shipping destinations (e.g., the customer's assembly plants) in order to install the locator pins. It would be desirable to increase packing density while preserving the functionality of a locator pin.

With or without locator pins, spacers are typically employed between adjacent glass panels in shipping racks to reduce damage during shipping. When transporting glass panels with long locator pins, spacer thickness must be greatly increased in order to accommodate the pin length. Thus, it would also be desirable to reduce or eliminate the need for spacers.

SUMMARY OF THE INVENTION

The present invention provides a folding pin capable of dual use as a spacer between glass panels during shipment and a locator pin during assembly to a vehicle. A higher packing density is achieved which reduces shipping costs and lowers expenditures associated with the shipping racks themselves.

In one aspect of the invention, a locator pin is provided for aligning a glass panel during installation on a vehicle. The locator pin includes a base for affixing to the glass panel in a predetermined position prior to transporting it from a site where the glass panel is formed. A pin body has an elongated portion with a proximal end and a distal end defining a longitudinal axis. A hinge pivotally attaches the pin body to the base at the proximal end so that the pin body pivots between a shipping position wherein the longitudinal axis is substantially parallel to a surface of the glass panel and an alignment position wherein the longitudinal axis is substantially perpendicular to the surface of the glass panel.

BRIEF DESCRIPTION OF THE DRAWINGS

FIGS. 11-15 are top and side views of another embodiment of the folding pin.

DETAILED DESCRIPTION OF PREFERRED EMBODIMENTS

Figure 1:
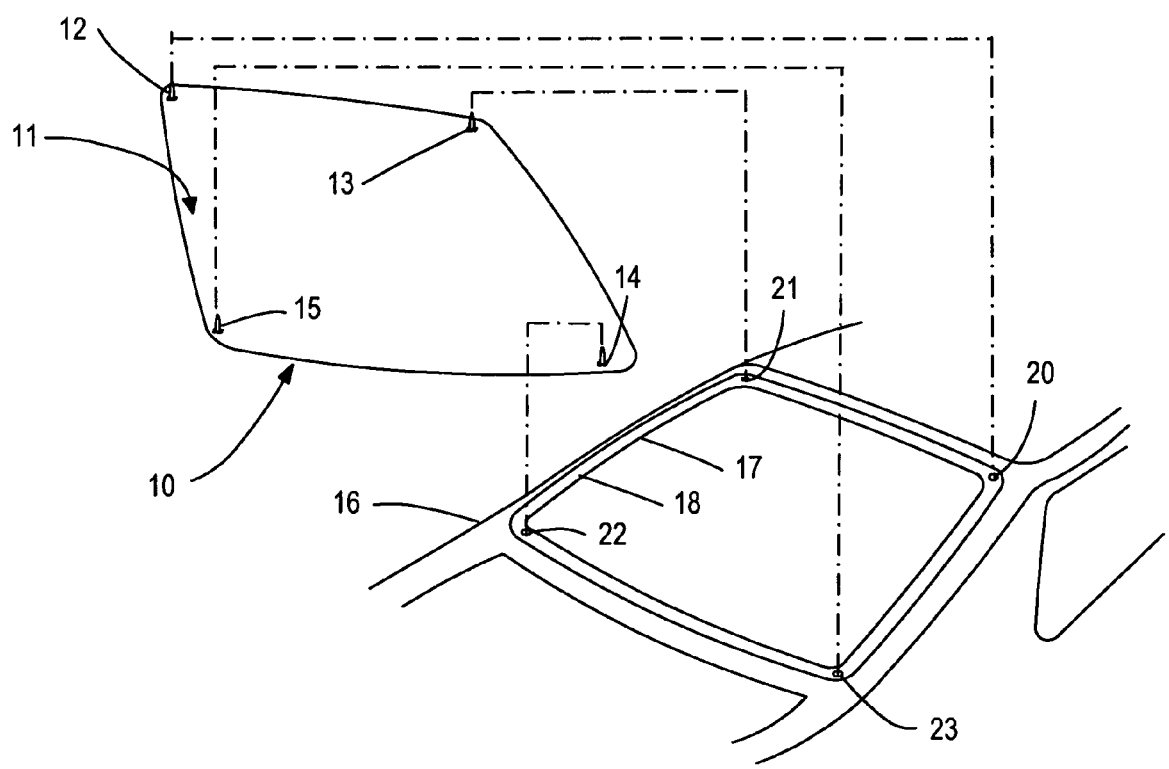
FIG. 1 is a perspective diagram showing the use of locator pins in assembling a windshield to a vehicle frame.
Figure 2:
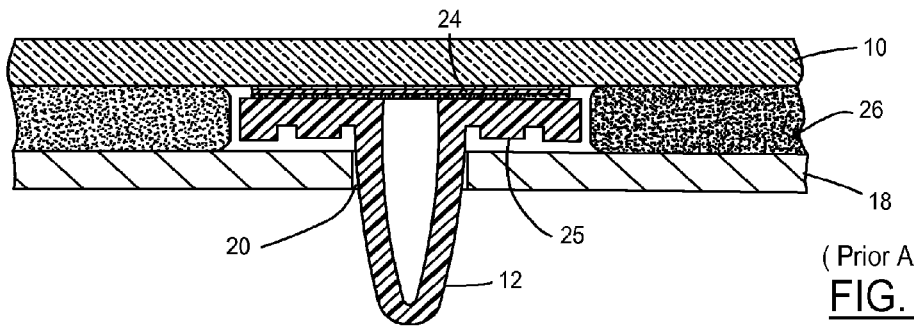
FIG. 2 is a cross-sectional view of a locator pin installed in a vehicle frame.

Referring now to FIG. 1, a glass panel 10 has an inner surface 11 to which are mounted locater pins 12-15 at the corners near the peripheral edge of surface 11. Panel 10 is adapted to be mounted to a vehicle frame 16 having a windshield aperture 17. A well 18 may be formed around the edge of aperture 17 and includes a plurality of mounting holes 20-23 for receiving locator pins 12-15, respectively. Glass panel 10 is maneuvered into position so that pins 12-15 are inserted into mounting holes 20-23. The locating pins hold glass panel 10 in place for rigid attachment by a urethane adhesive as shown in FIG. 2. Thus, locator pin 12 extends through mounting hole 20 in frame well 18 so that a support surface 25 of locator pin 12 supports glass panel 10 at a predetermined spacing to accommodate a urethane layer 26 applied in a conventional manner. Locator pin 12 may be attached to glass panel 10 by an adhesive tape 24, for example.

Figure 3:
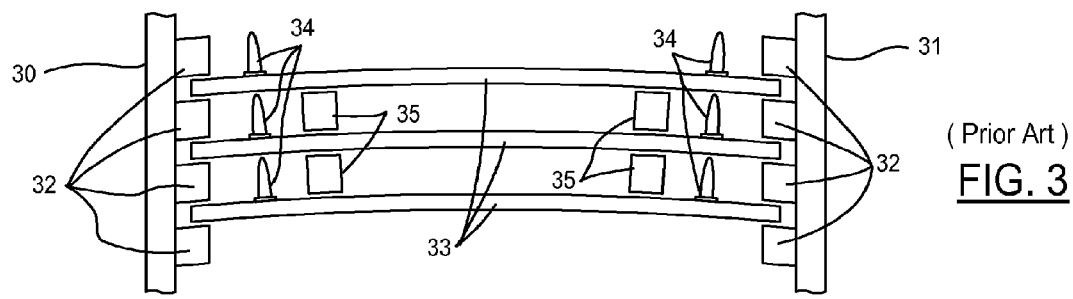
FIG. 3 is an end view of prior art glass products stacked in a shipping rack.

The effect of the locator pins on packing density during shipment of glass panels is shown in FIG. 3. A shipping rack for containing the glass panels and for loading onto and off of a transport vehicle such as a truck includes a pair of side rails 30 and 31. Rails 30 and 31 may include support spacers 32 at an appropriate spacing for separating glass panels 33 by a distance no less than the height of locator pins 34. Additional spacers 35 may also be provided between adjacent glass panels 33. As a consequence of the height of locator pins 34, glass panels 33 have a low packing density.

Figure 4:
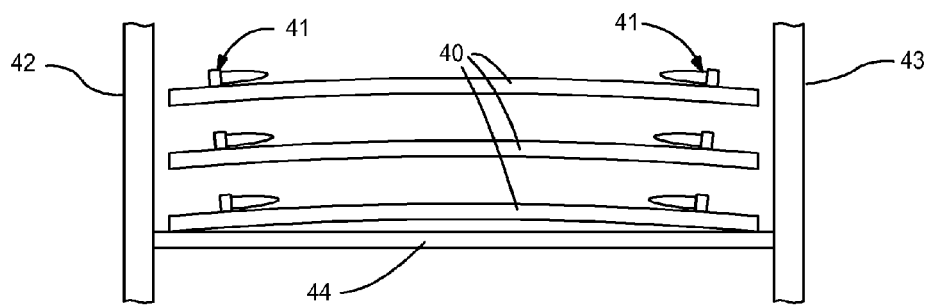
FIG. 4 is an end view of glass panels with the folding hinge of the present invention stacked in a shipping rack.

FIG. 4 shows a plurality of glass panels 40 having folding locator pins 41 according to the present invention. Panels 40 are loaded in a shipping rack having side rails 42 and 43 on opposite sides of a bottom panel 44. FIG. 4 shows an increased packing density by virtue of the pins being re-oriented in a direction substantially parallel to glass panels 40 into a shipping position from which they can be folded upward after removal from the shipping rack for installation on a vehicle. Moreover, some or all of the separate spacers can be eliminated by integrating a spacer function into folding locator pins 41 when they are in their folded positions.

Figure 5:
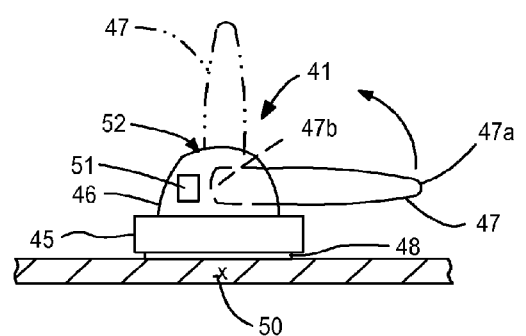
FIG. 5 is a side, plan view showing a folding pin mounted to a glass panel.
Figure 6:
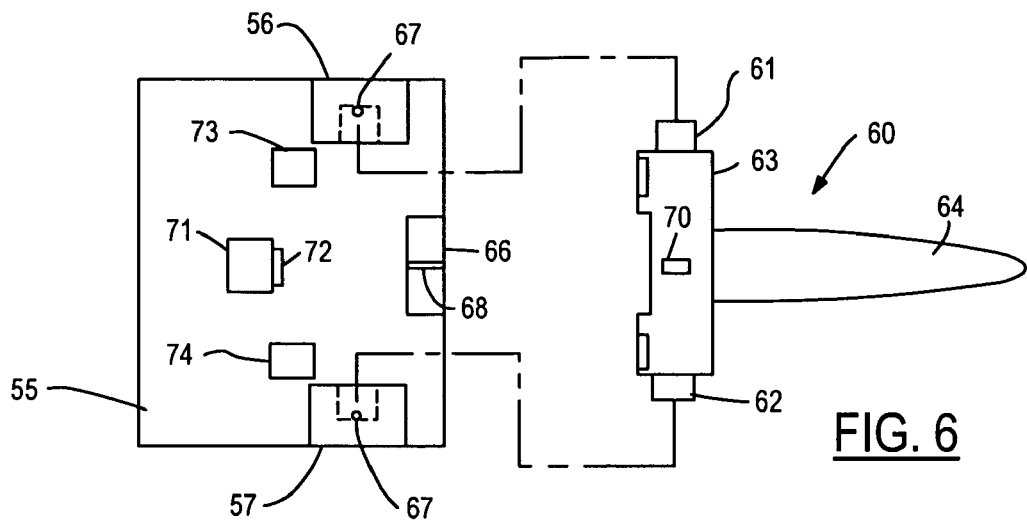
FIG. 6 is a top, exploded view showing a folding pin in greater detail.
Figure 7:
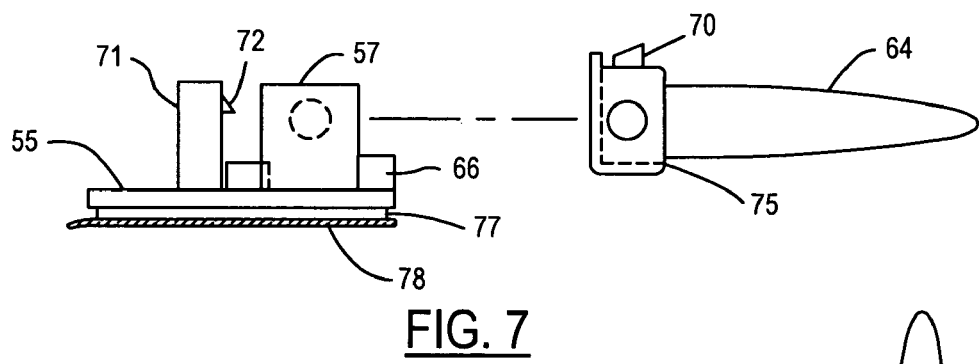
FIG. 7 is a side, exploded view of the folding pin of FIG. 5.
Figure 8:
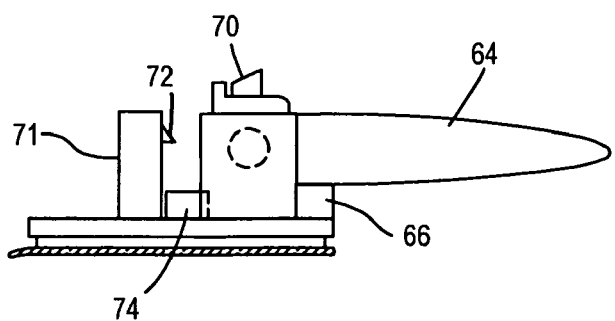
FIG. 8 is a side view of the folding pin in the shipping position.

A locator pin 41 of the present invention is shown in greater detail in FIG. 5. A base portion 45 carries a hinge portion 46 to which a pin body 47 is pivotally mounted. An adhesive layer 48 affixes base 45 to glass panel 40 at a predetermined position 50. Locator pin 41 may be affixed to glass panel 40 in the proper location using an automatic placement machine, for example.

Pin body 47 has a distal end 47a and a proximal end 47b mounted in hinge portion 46, whereby the pin body has a longitudinal axis extending between ends 47a and 47b. Pin body 47 pivots between a shipping position wherein the longitudinal axis is parallel to the surface of glass panel 40 and an alignment position (shown in phantom) wherein the longitudinal axis is substantially perpendicular to the surface of glass panel 40.

A locking feature 51 is integrated with hinge portion 46 for positively retaining pin body at least in the alignment position, and optionally in the shipping position. If locked in the shipping position, the retention force is sufficiently small to be overcome manually when switching the pin body into the alignment position.

Locator pin 41 preferably provides a support surface 52 that can act as a bearing shoulder of a spacer in order to contact an adjacent glass panel when in the shipping position and affixed to a glass panel in a shipping rack with a stack of glass panels. Support surface 52 may also be used for supporting the glass panel on the vehicle frame when the pin body is in the alignment position and inserted into a corresponding mounting hole on the vehicle frame. Support surface 52 is generally parallel with the surface of glass 40 and thus is generally perpendicular to the longitudinal axis of the pin body when the pin body is in the alignment position.

A frangible tab (not shown) may be provided for holding pin body 47 in the shipping position until broken by a force for shifting pin body 47 into the alignment position. The frangible tab may connect pin body 47 to base 45 or may be incorporated into the hinge 46.

Another embodiment for the locator pin is shown in FIGS. 6-9. A base 55 supports hinge posts 56 and 57 for receiving hinge pins 61 and 62 of a pin body 60. A crossbar 63 is formed integrally with hinge pins 61 and 62 and alignment pin 64. In the shipping position, pin 64 rests on a block 66 extending from base 55.

Figure 9:
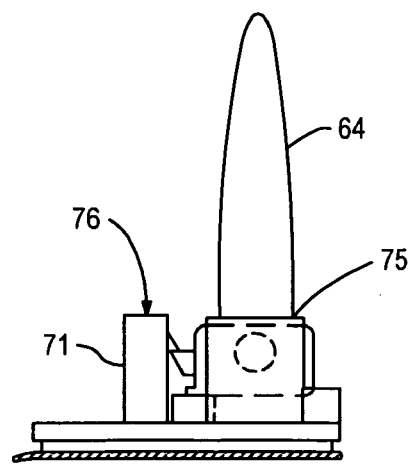
FIG. 9 is a side view of the folding pin in the alignment position.

Base 55 and pin body 60 may preferably be formed of injection molded plastic, and are preferably molded together in substantially one operation. Consequently, base 55 and pin portion 60 are not freely moving upon the removal from the mold. Instead, there are at least portions of flashing between the two elements, such as flash 67 between hinge posts 56 and 57 and hinge pins 61 and 62, respectively, and flash 68 between block 66 and alignment pin 64. The flashing may preferably act as the frangible tabs for holding pin body 60 in the shipping position. The strength of the flashing is sufficiently low that a vehicle installer can manually break the flashing by pulling upward on pin 64. Crossbar 63 has a first tab 70 to form part of a locking feature for the alignment position. A post 71 on base 55 has a second tab 72 for interlocking with tab 70 as shown in FIG. 9 to retain pin 64 in the alignment position. A pair of blocks 73 and 74 contact crossbar 63 to support it when in the alignment position. Furthermore, a support surface 75 of crossbar 63 around pin 64 and a top surface 76 of post 71 provide a support surface for contacting the vehicle frame and providing the desired standoff height.

An adhesive applied to the underside of base 55 preferably comprises a double-sided tape 77 with a peelable protective layer 78 that protects the adhesive prior to application to a glass panel.

Figure 10:
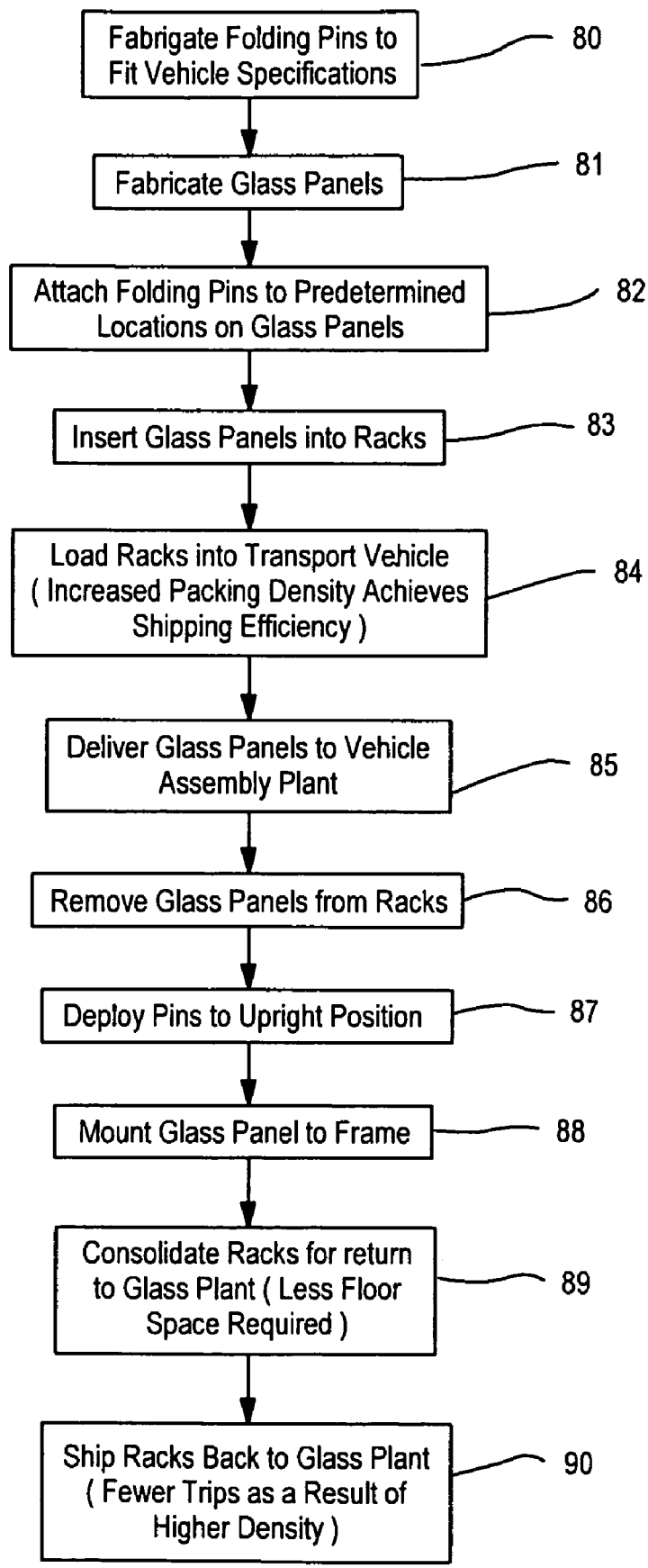
FIG. 10 is a flowchart showing one preferred embodiment of the invention.

A preferred method of the invention for processing and shipping glass panels for assembly onto vehicles is shown in FIG. 10. In step 80, a plurality of folding pins are fabricated according to vehicle specifications so that they fit the associated mounting holes and provide the desired standoff. A plurality of glass panels are fabricated in step 81. Folding pins are attached to predetermined locations on the glass panels in step 82. Such placement may be preferably performed using an automatic placing machine.

When ready for shipping, the fabricated glass panels with attached folding pins are inserted into shipping racks in step 83. The racks are loaded into a transportation vehicle in step 84. Due to the increased packing density achieved by use of the folding pins, shipping efficiency is increased. In step 85, the transportation vehicle delivers the glass panels to a vehicle assembly plant.

At the receiving end, the glass panels are removed from the racks in step 86 and the folding pins are deployed to their upright position in step 87. The vehicle assembler then mounts the glass panel to the frame in step 88 so that the pins enter the corresponding mounting holes. Thus, the glass panels (e.g., windshields) are properly held in place during curing of a urethane adhesive that is typically used for vehicle assembly.

The shipping racks which held the glass panels during shipping are consolidated for return to the glass fabrication plant in step 89. Since the racks hold the glass panels at a higher packing density, there is less rack volume used for any particular number of glass panels, which means that less floor space is used at the vehicle assembly plant for storing the consolidated racks. The shipping racks are then sent back to the glass plant in step 90. Thanks to the greater packing density, fewer shipments are required to return the shipping racks, resulting in further savings in transportation.

FIGS. 11-15 show yet another embodiment wherein the folding pin is formed as a single molded piece. A base 91 is molded to be substantially co-planar with a pin body 92 which is joined via a hinge section 93. Hinge section 93 is shaped by a contoured slot (such as a living hinge) to allow bending upwards of pin body 92 so that it may be captured by a locking structure 94 extending from the top of base 91. Locking structure 94 has a pair of jaws 95 and 96 extending alongside a recess 97. When moving from the shipping position to the alignment position, pin body 92 pivots around hinge section 93. As it contacts jaws 95 and 96, they deflect and pin body enters recess 97 where it is securely held. Locking structure 94 provides both a bearing surface for stacking panels during shipping and a standoff surface for suspending the panel the desired distance above the vehicle frame while in the alignment position. An adhesive 98, such as a double-sided tape, is applied to the underside of base 91.

In addition to reduced transportation costs, the shipping racks or other containers utilized are simplified, thereby reducing the costs of manufacturing the racks. The reduced complexity of the racks can also enable greater interchangeability for use with different types of glass panels. The elimination of separate rack spacers eliminates the spacer cost and reduces labor at both the glass plant and the vehicle assembly plant.

What is claimed is:

1. A locator pin for aligning a glass panel during installation on a vehicle, comprising:
   a base for affixing to the glass panel at a predetermined spot on the glass panel prior to transporting the glass panel to a site where the glass panel will be installed on the vehicle;
   a pin body having an elongated portion with a proximal end and a distal end defining a longitudinal axis; and
   a hinge for pivotally attaching the pin body to the base at the proximal end, the pin body pivoting between a shipping position wherein the longitudinal axis is substantially parallel to a surface of the glass panel and an alignment position wherein the longitudinal axis is substantially perpendicular to the surface of the glass panel.

2. The locator pin of claim 1 further comprising a locking feature for retaining the pin body in the alignment position after being rotated from the shipping position.

3. The locator pin of claim 1 wherein the pin body further comprises a support surface generally perpendicular to the longitudinal axis for supporting the glass panel on a vehicle frame with the pin body in the alignment position during attachment of the glass panel to the vehicle.

4. The locator pin of claim 1 comprising a bearing shoulder formed on at least one of the base or the hinge for contacting an adjacent glass panel when in the shipping position and affixed to a glass panel that is mounted in a shipping rack for stacking a plurality of glass panels.

5. The locator pin of claim 1 wherein the base and the pin body are integrally formed by injection molding.

6. The locator pin of claim 1 further comprising an adhesive applied to an underside of the base adapted to affix the base to the glass panel.

7. The locator pin of claim 6 wherein the adhesive is comprised of a double-sided adhesive tape.

8. The locator pin of claim 1 further comprising a frangible tab for holding the pin body in the shipping position until broken by a force for shifting the pin body to the alignment position.

9. The locator pin of claim 8 wherein the frangible tab is comprised of a flash section joined to the hinge.

10. A glass product for installation in a frame having a plurality of mounting holes, comprising:
    a glass panel adapted to be mounted to the frame; and
    a plurality of locator pins affixed to a surface of the glass panel at positions corresponding to the mounting holes, wherein each locator pin comprises:
    a base;
    a pin body having an elongated portion with a proximal end and a distal end defining a longitudinal axis; and
    a hinge for pivotally attaching the pin body to the base at the proximal end, the pin body pivoting between a shipping position wherein the longitudinal axis is substantially parallel to a surface of the glass panel and an alignment position wherein the longitudinal axis is substantially perpendicular to the surface of the glass panel.

11. The glass product of claim 10 wherein each locator pin further comprises a locking feature for retaining the pin body in the alignment position after being rotated from the shipping position.

12. The glass product of claim 10 wherein each locator pin further comprises an adhesive applied to an underside of the base affixing the base to the glass panel.

13. The glass product of claim 10 wherein each pin body further comprises a support surface generally perpendicular to the longitudinal axis for supporting the glass panel on the frame with the pin body in the alignment position with the distal end extending through a respective mounting hole during attachment of the glass panel to the frame.

14. The glass product of claim 10 wherein each locator pin further comprises a frangible tab for holding the pin body in the shipping position until broken by a force for shifting the pin body to the alignment position.

15. The glass product of claim 14 wherein the base and the pin body of each locator pin are integrally formed by injection molding and the frangible tab is comprised of a flash section joined to the hinge.

16. A method of processing and shipping glass panels for assembly onto vehicles, comprising the steps of:
    fabricating a plurality of glass panels for delivery to a destination:
    attaching folding pins at predetermined locations on at least some of the glass panels, wherein each folding pin comprises a base affixed to a respective glass panel, a pin body having an elongated portion with a proximal end and a distal end defining a longitudinal axis, and a hinge for pivotally attaching the pin body to the base at the proximal end, the pin body pivoting between a shipping position wherein the longitudinal axis is substantially parallel to a surface of the glass panel and an alignment position wherein the longitudinal axis is substantially perpendicular to the surface of the glass panel;
    inserting the glass panels having folding pins into shipping racks with each folding pin in a shipping position;
    delivering the shipping racks with glass panels to the destination;
    removing the glass panels from the shipping racks;
    moving the pin bodies of the folding pins from the shipping position to the alignment position; and
    mounting each glass panel to a respective frame of a respective vehicle so that each pin body extends through a mounting hole in the respective frame.

17. The method of claim 16 wherein each folding pin provides a bearing shoulder formed on at least one of the base or the hinge for contacting an adjacent glass panel when in the shipping rack, so that the folding pin acts as a spacer between adjacent glass panels.

18. A glass product for installation in a frame having a plurality of mounting holes, comprising:
    a glass panel adapted to be mounted to the frame; and
    a plurality of locator pins affixed to a surface of the glass panel at positions corresponding to the mounting holes, wherein each locator pin comprises:
    a base;
    a pin body having an elongated portion with a proximal end and a distal end defining a longitudinal axis; and
    a hinge for pivotally attaching the pin body to the base at the proximal end, the pin body pivoting between a shipping position wherein the longitudinal axis is substantially parallel to a surface of the glass panel and an alignment position wherein the longitudinal axis is substantially perpendicular to the surface of the glass panel;
    wherein each locator pin comprises a bearing shoulder formed on at least one of the base or the hinge for contacting an adjacent glass panel when in the shipping position and when the glass panel that is mounted in a shipping rack for stacking a plurality of glass panels.

* * * * *